(No Model.) 4 Sheets—Sheet 1.

J. A. FORBES.
AUTOMATIC SOLDERING MACHINE.

No. 254,124. Patented Feb. 28, 1882.

(No Model.) 4 Sheets—Sheet 3.
J. A. FORBES.
AUTOMATIC SOLDERING MACHINE.

No. 254,124. Patented Feb. 28, 1882.

Witnesses:
Jas. E. Hutchinson.
Alfred Stover.

Inventor.
John A. Forbes,
By F. A. Williams,
Atty.

(No Model.)  4 Sheets—Sheet 4.
J. A. FORBES.
AUTOMATIC SOLDERING MACHINE.
No. 254,124.  Patented Feb. 28, 1882.
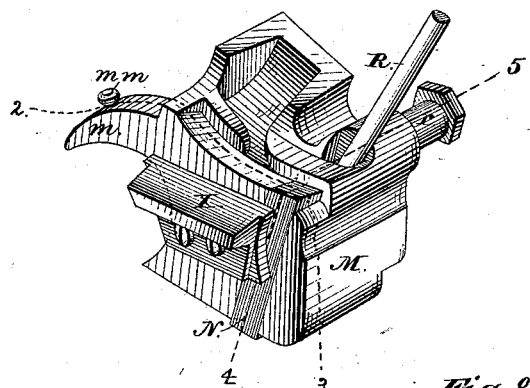
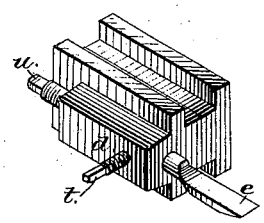
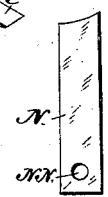
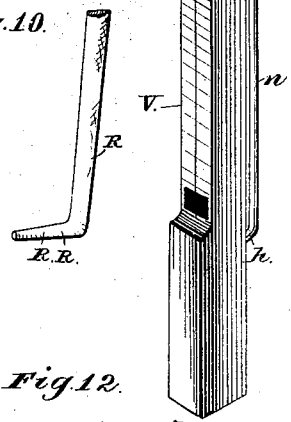
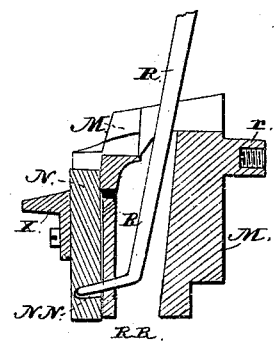
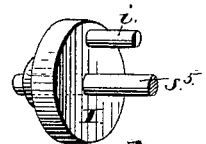
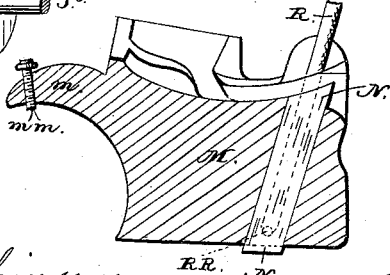
Witnesses
Jas. E. Hutchinson
Alfred Stover
Inventor
John A. Forbes
By F. A. Williams,
Atty

UNITED STATES PATENT OFFICE.

JOHN ALEXANDER FORBES, OF DOVER, DELAWARE, ASSIGNOR OF ONE-HALF TO FREDERIC A. WILLIAMS, OF SAME PLACE.

AUTOMATIC SOLDERING-MACHINE.

SPECIFICATION forming part of Letters Patent No. 254,124, dated February 28, 1882.

Application filed September 17, 1881. (No model.)

*To all whom it may concern:*

Be it known that I, JOHN ALEXANDER FORBES, of the town of Dover, in the county of Kent and State of Delaware, have invented certain new and useful Improvements in Automatic Soldering-Machines; and I do hereby declare that the following is a full, clear, and exact description of the invention, which will enable others skilled in the art to which it appertains to make and use the same, reference being had to the accompanying drawings, which form a part of this specification.

The object of my invention is to provide machinery for soldering the heads to the bodies of tin cans. This is accomplished by certain devices which operate automatically, thus saving hand-labor in the soldering operation as well as in the delivery and removal of the cans.

Figure 1 is a side view of the machine. Fig. 2 is a sectional view from the same position as in Fig. 1. Fig. 3 is an end view. Fig. 4 represents a bar used in the machine. Fig. 5 is a view of the solder-cutting apparatus used in the machine, from the same point of observation as in Fig. 2. Fig. 6 is a perspective view of the iron M and copper bar N, by which the molten solder is held and applied. Figs. 7, 8, 9, 10, 11, 12, and 13 are detail views of parts of the machine.

In Fig. 1, A is a frame on each side of the machine, to furnish bearings for the shafts $S'$ $S^2$ $S^3$ $S^4$ $S^5$ $S^6$ $S^7$. Upon these shafts are the respective cog-wheels B, C, D, E, F, G, and H and the pulleys J. Upon the shaft $S'$ is a crank, Q, or belt-wheel, by which the necessary power is applied. The motion of $S'$ is imparted to $S^2$ and $S^4$ by the engagement of the wheel B on $S'$ with the wheels C and E, and to $S^6$ by the wheels $B^2$ and H. The wheel C drives the shaft $S^3$, and the wheel F on shaft $S^4$ drives the wheel G and shaft $S^5$. K is an endless chain passing over pulleys on the shafts $S'$ and $S^7$.

Z is a lamp or other burner for heating the iron M.

P is a plate or disk inside the frame A and fast upon the shaft $S^4$.

L is a bar reciprocating lengthwise and carrying upon its upper end a box which works in a slot in the frame A. This box furnishes a bearing for the shaft $S^3$, on which is a roller, D D, for guiding and assisting to rotate the cans. The bar L is lifted by contact of the pin $i$ on the wheel I of shaft $S^5$ (see Fig. 9) with the projection $l$ on the lower edge of the bar L. This movement of the bar L raises the roller D D and admits cans to the working-space between the roller D D above and the iron M below. $a$ is a lever, pivoted at $b$ on the frame A of the machine, carrying the box $d$ upon its upper end. This box works horizontally in a slot in the frame A and carries a knife, $e$, inside the frame A, as shown in Figs. 2, 5, and 7. This lever $a$ is moved alternately by the pin $i$, above mentioned, and the spring $p$. The wheel H on $S^6$ runs a fan or blower for cooling the newly-soldered seams.

In Fig. 2 the inside of the opposite frame A is shown, the feed-board O, the endless chain K, the iron M, and the burner Z being in position as in Fig. 1. M (see also Fig. 6) is the soldering-iron, curved upon a part of its upper surface to correspond nearly with the curve of a can, the curve being made deeper at the back to furnish a small reservoir for the molten solder. The iron M is pivoted at one end at $r$ on the frame A, (see Figs. 6, 11, and 13,) and is supported at the other end by a lug, $m$, projecting over the shaft $S^5$. Upon this shaft and under the lug $m$ is a scroll-cam, $s$, which, revolving with $S^5$, slowly raises and lowers this end of the iron M at each revolution of $S^5$. The flange X on the iron M holds N in position and protects the body of the can from the heat below. N (see also Fig. 6) is a small bar of copper placed in a groove in the iron M. The upper end of this bar is also curved to fit the curve of a can. Against this curved end of the bar N the head-seams of the can are made to run. N is held in position by the flange X on the iron M and the rod R, and is adjusted to the wear from the cans by means of the screw-wheel W and the thread on the rod R, which is pivoted at its lower end to the bar N, as shown in Fig. 13. The cans, resting upon the upper ends of the bars N and just over the curved edges of M and M, are rotated by friction from the disks P and P', hereinafter described, and the rollers D D above and C C below. V (see also Fig. 8) is a tube, through which bar-solder is delivered to the irons M. e (see also Figs. 5 and 7) is a horizontally-reciprocating knife in the box d, working in the frame A, and moved by the lever a, pivoted at b on the outside of the frame, as already shown in Fig. 1. The knife e is held in the box d by the set-screw t, and is adjusted to the wear by the set-screw u. This knife cuts the bar of solder into bits of suitable lengths. The pin h forms an obtuse angle with the rod n. On this pin the bar of solder in the tube rests. Fig. 5 shows an enlarged passage in the tube V, below the knife e, to permit the solder, when cut into short bits, to slide from the pin h and drop upon the iron M below. Y' is a can moving to the iron M. Y² is a can in position for being soldered. Y³ is a can leaving the machine on the endless chain K. S B is a sagging and stationary belt, hereinafter described.

In Fig. 3 the can Y² is shown resting on the pulleys E E, between disks P P', and with each end resting over the irons M. The roller D D above holds the can down upon the bar N, and with C C and E E below and the disks P P' at each end holds the cans and confines their movements within certain precise limits during the soldering operation. In this figure may be seen on either end the bars L and L for lifting the roller D D, and the levers a and a for operating the knife e, above described. g is an arm on the shaft S⁵, which, by its rotation with S⁵, automatically removes the soldered cans from the irons M to the endless chain K. (See also on the same shaft the cams s and s for raising and lowering the irons M and M; also the wheels I and I.) The shafts S⁴ and S⁴ carry and drive the disks P P'. On the left side the shaft S⁴ is made to slide lengthwise and horizontally in its bearings in the frame A. The bar L' (see Fig. 4) carries upon its outer side a small wedge, w, which strikes a shoulder or other projection, x, upon S⁴. The movement of L' in raising D D serves by means of this wedge and x to move the disk P' horizontally away from the can. The spring P Z restores the disk P' to its former position when the bar L' descends.

Fig. 4 represents the bar L'.

In Figs. 5, 7, and 8 are enlarged views of the solder-cutting apparatus. The pin i, Fig. 9, striking the lower end of the lever a, moves the knife e through an opening in the tube V. In this tube, Fig. 8, is placed a bar of solder, which by the knife e is cut into bits. These bits drop upon the iron M below, as shown by dotted lines in Fig. 2, where they are melted. While in the tube the solder-bar rests upon the pin h of the rod n, which may be raised or lowered to alter the length of the cut pieces by means of the nut o and thread upon the upper end of the rod. When a piece of solder is cut off it slides from the pin h onto the iron M, and upon withdrawal of the knife from the tube the bar of solder above it drops upon the pin h in position for another cut.

After cutting the solder the knife is withdrawn by the action of the spring p, attached to the lever a and frame A.

Fig. 6 is an enlarged view of the iron M and the copper bar N, showing the pivot r, by which M is fastened to the frame A, and the lug m, by means of which and the cam s the other end of M is raised and lowered. m m is a set-screw extending through m, by means of which the height of the movement of m on s is regulated.

Figs. 7, 8, and 9 have been described.

Fig. 10 represents the copper bar N, (seen in a slot in the iron M of Figs. 6 and 12.)

Fig. 11 represents the rod R for adjusting the bar N. R R, the bent lower end of R, is inserted in the hole N N of the bar N, as shown in Fig. 13, and the bar is raised or lowered by the wheel W in Fig. 2.

Fig. 12 shows the reservoir-iron M as cut on the line 2 3 of Fig. 6.

Fig. 13 is a sectional view of M from opposite point of observation, as in Fig. 3, showing the iron M and its connections as cut on the line 4 5 of Fig. 6.

Figure 1:
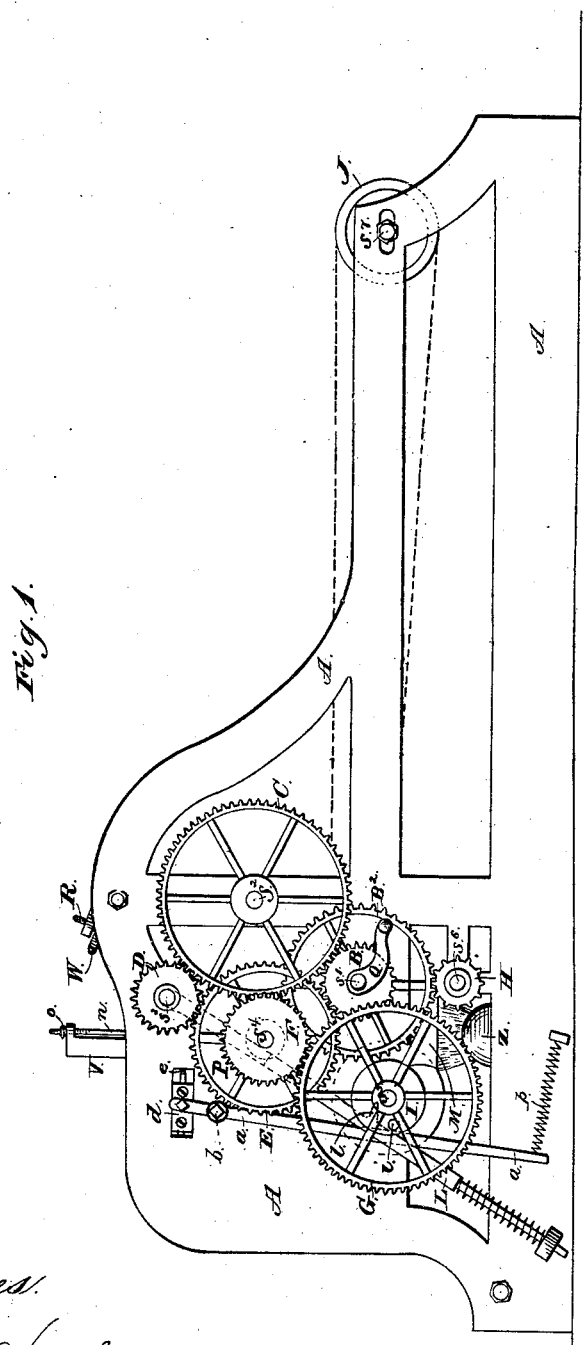
Figure 2:
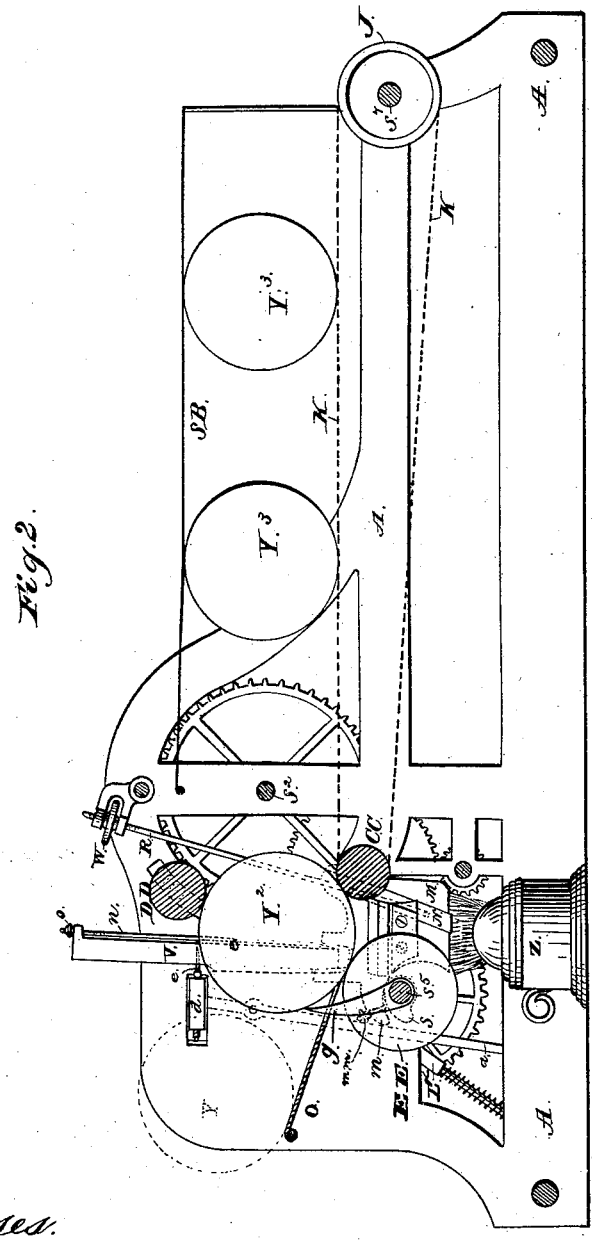
Figure 3:
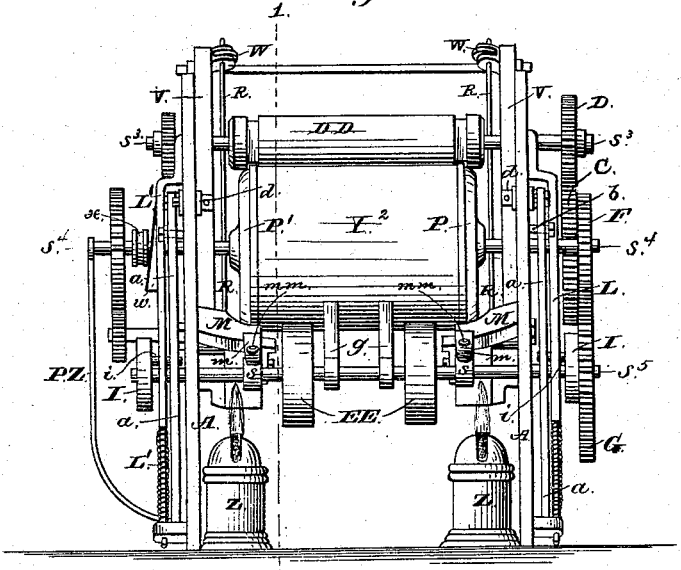
Figure 4:
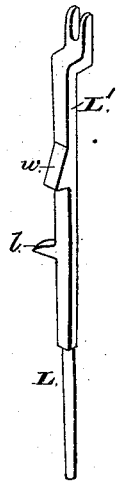
Figure 5:
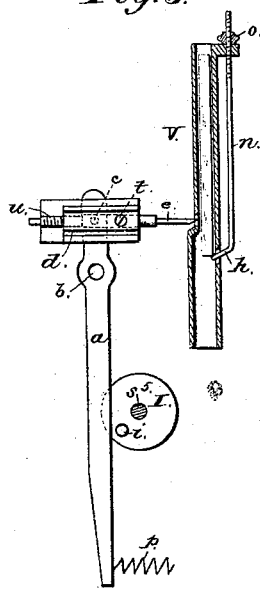

The operation of the machine is as follows: Power, being applied to the crank or belt wheel Q on shaft S' of Fig. 1, is imparted to the various wheels and shafts, as already shown. The roller D D is lifted and one of the disks, P, is withdrawn, as already explained. A can, Y, now placed on the feed-board O, rolls over the pulleys E E, and rests immediately upon E E and the roller C C and the copper bars N at each end. The bars L now descending, the can is firmly griped between the disks P at each end, and the roller D D above and C C and E E below. At the same time the disk P is pressed firmly against the head of Y by the action of the spring P Z upon the end of the shaft S⁴. The disks and rollers give a powerful rotary movement to the can. Bits of solder from the cutting apparatus above described have already been dropped from the tube V upon the irons M and M. When melted the solder flows down into the curved part of the iron M. This curved upper edge of M forms a small reservoir for the melted solder. Each head of the can runs over one of these reservoirs and upon the point of the bar N. During the rotation of the can the back ends of the irons M are gradually raised by the scroll-cams s, thus pouring the molten solder forward to the point of contact between Y and N, and the friction between N and the seam of the can applies the solder evenly to all parts of the seam. The soldering operation being completed by one or more rotations of the can, the roller D D is again lifted, the disk P withdrawn, the arm g throws the soldered can off the iron M upon the chain K in time for the introduction of another can before the roller D D descends, and the operation is repeated without loss of time or stoppage of the machinery. The sagging belt or brake S B, Fig. 2, by its contact with the cans upon the carrier K, retards their forward movement and continues their rotary movement until the solder is entirely cooled.

What I claim is as follows:

1. The combination of the tube V, rod $n$, nut $o$, and pin $h$ with the knife $e$, box $d$, screws $t$ and $u$, lever $a$, pivot $b$, spring $p$, and the pin $i$ and wheel I on shaft $S^5$, as and for the purpose herein set forth.

2. An oscillating iron reservoir M, pivoted at $r$ on the frame A, containing the copper bar N, the lug $m$, and the screw $m\,m$, M and N being shaped upon the upper end to fit the curve of a can, and the whole being moved by $s$ and $S^5$, as and for the purpose herein set forth.

3. The copper bar N, in combination with the grooved oscillating iron M and the adjustable rod R, pivoted to N, R and N being adjustable by means of the wheel W.

4. The combination of the pulleys E E with the disks P and P', the rollers C C and D D, and the parts M and N, for holding and guiding cans during the soldering operation.

5. In a soldering-machine, the combination of M and N with the means, P and P', D D, and C C, for rotating, and also with the means, O, $g$, and K, for carrying cans through the machine.

6. In a soldering-machine, the combination of the following parts for automatically reciprocating the disk P': shaft $S^5$, wheel I, and pin $i$, with the bar L', wedge $w$, shoulder $x$ or other projection from shaft $S^4$, and $S^4$ carrying the disk P, and the spring P Z, substantially as herein described and set forth.

7. In a soldering-machine, the combination of the brake S B with the carrier K, substantially as and for the purpose specified.

In testimony that I claim the foregoing as my own I have hereunto affixed my signature in presence of two witnesses.

JOHN ALEXANDER FORBES.

Witnesses:
ALFRED STOVER,
ALBERT COWGILL.